United States Patent [19]
Villarreal-Dominguez

[11] 3,964,927
[45] June 22, 1976

[54] LEAD DIOXIDE-ZINC RECHARGEABLE-TYPE CELL AND BATTERY AND ELECTROLYTE THEREFOR

[76] Inventor: Enrique Villarreal-Dominguez, Edificio 28-Depto, 302, Villa Olimpica, Mexico City 22, Mexico

[22] Filed: Oct. 10, 1974

[21] Appl. No.: 513,558

[52] U.S. Cl. .................................... 136/26; 136/30; 136/154
[51] Int. Cl.$^2$.......................................... H01M 4/36
[58] Field of Search ................ 136/26, 30, 154, 114

[56] References Cited
UNITED STATES PATENTS

| | | | |
|---|---|---|---|
| 624,744 | 5/1899 | Blumenberg, Jr. | 136/154 |
| 1,512,485 | 10/1924 | Pouchain | 136/154 |
| 1,900,616 | 3/1933 | Pouchain | 136/154 X |
| 2,649,766 | 8/1953 | Johnson | 136/154 |
| 3,291,646 | 12/1966 | Gould | 136/154 X |
| 3,447,971 | 6/1969 | Ammerman | 136/26 |

*Primary Examiner*—John H. Mack
*Assistant Examiner*—C. F. LeFabour
*Attorney, Agent, or Firm*—Flynn & Frishauf

[57] ABSTRACT

A lead dioxide-zinc rechargeable-type cell comprises at least one positive lead dioxide plate, at least one negative amalgamated zinc metal plate spaced from said positive plate and parallely confronted thereto, both plates being permanently submerged in an aqueous acid electrolyte containing soluble zinc salts, a zinc surface-controlling agent, an electrolyte conductivity-correcting agent and an amalgamating agent to prevent formation of localized cells or electrolytic pairs on the zinc plate during discharge.

An electrolyte suitable to be used in a lead dioxide-zinc rechargeable-type cell comprises an aqueous acid solution of a zinc salt, aluminum sulfate as the zinc surface-controlling agent, sodium sulfate as the electrolyte conductivity-correcting agent, mercuric sulfate as the amalgamating agent and sulfuric acid as an aggressive agent which also acts to minimize the "treeing" of the anodic surfaces.

More particularly an electrolyte to be used in a lead dioxide-zinc rechargeable-type cell comprises from 1 to 5 g/l of zinc sulfate, 25 to 75 g/l of sodium sulfate, 25 to 75 g/l of aluminum sulfate, 2 to 8 g/l of mercuric sulfate and 250 to 500 g/l sulfuric acid, the remainder being water.

Preferably the electrolyte may additionally contain 10 to 30 g/l of a suitable gum such as dextrin to improve the physical structure of the zinc deposited, and 5 to 15 g/l of dibutyl amine as a corrosion inhibitor.

4 Claims, No Drawings

LEAD DIOXIDE-ZINC RECHARGEABLE-TYPE CELL AND BATTERY AND ELECTROLYTE THEREFOR

BACKGROUND OF THE INVENTION

The present invention refers to a lead dioxide-zinc rechargeable-type cell in which the positive and negative plates remain submerged in the electrolyte and, more particularly, it is related to a lead dioxide-zinc rechargeable-type cell which plates are permanently submerged in an electrolyte which provides sufficient aggressivity against the anode to attack the same at closed circuit but not sufficiently aggressive to attack the same at open circuit.

Heretofore it has been well known to build rechargeable-type cells comprising a positive plate of lead dioxide and a negative plate of lead and designed so that the electrolyte can be introduced before placing the cell in service. This type of rechargeable cells can be stored in the unactivated state indefinitely without requiring special precautions against deterioration and have an exceptionally good watt-hour capacity per unit of cell weight and operate satisfactorily at low temperatures.

The very well known lead storage battery described above, however, has shown very serious drawbacks, such as the fact that the voltage obtained thereby is relatively low and does not exceed two volts while, on the other hand, the utilization of the lead dioxide is limited by the formation of insoluble lead sulfate which gradually accumulates in the cell rendering it useless in a relatively short time when care is not exercised such that the drainage of the cell is not sufficiently great to cause excessive formation of insoluble lead salts.

Regardless of the above disadvantages shown by the lead storage battery which has been of common use heretofore, use of these type of batteries has not been abandoned in view of the fact that there is no efficient substitute therefor, inasmuch as the prior art lead dioxide-zinc type cells have been considered to be useful only for discharges of short duration, despite the fact that lead dioxide-zinc cells provide a relatively high electromotive force such as, for instance, 2.5 volts and higher. In other words, prior art lead dioxide-zinc cells have been considered to be useless in prolonged discharges, inasmuch as the electrolyte provided in these cells (commonly sulfuric acid) in which lead salts are freely soluble is obviously precluded for cells designed for such prolonged discharges, due to the aggressivity of said electrolyte against zinc metal.

Therefore, for long it has been thought that for services requiring prolonged discharges, lead was the most desirable metal for the negative plates, inasmuch as cells with negative plates containing active metals more noble than lead have, of course, a low electromotive force. As zinc is an active metal less noble than lead, it has been thought that this couple, which provides a much higher electromotive force, should be considered as highly suitable. However, zinc does not provide for a rechargeable characteristic of the cells in the presence of a sulfuric acid electrolyte in view of the violent evolution of hydrogen which prevents redepositing of the zinc and, on the other hand, the cells cannot be stored with the plates submerged in the electrolyte, in view of the fact that the common sulfuric acid type electrolytes are too aggressive for the zinc metal, whereby they attack the negative plate easily even at open circuits.

Heretofore the only cells which have been put in service for limited applications are irreversible type cells comprising the zinc-sulfuric acid-lead dioxide system (W. J. Schlotter, The lead dioxide reserve type cell. J. Electrochem, Soc. Vol. 99, No. 8) or batteries of the type of potassium bisulfate-lead dioxide (J. C. Duddy, U.S. Pat. No. 3,466,194 of Sept. 9, 1960) in which the electrolyte is only contacted with the plates at the moment in which the cell is to be used, in view of the aggressivity of the acid medium over the zinc, even at open circuits. On the other hand, these cells are irreversible, that is, are not rechargeable, because under these conditions, the charging process causes many technical problems which have not been overcome, such as high hydrogen evolution which prevents electroplating of the zinc on the anode, "treeing" of the zinc deposits which causes short circuiting between the electrodes, and the necessity of a high degree of amalgamation of the zinc plates to prevent formation of localized cells, which renders said plates brittle, therefore rendering the system useless as an efficient electrical energy generating system.

Schlotter, therefore, very clearly indicates that because of the reactiveness of zinc in sulfuric acid, which is the common electrolyte previously used in this type of cells, accompanied by the evolution of hydrogen gas, it is necessary to store the lead dioxide-zinc type cells in a dry condition and to introduce the electrolyte when the cell is put into use. While this may be accomplished by means of a self contained chamber electrically or mechanically operated, or by introducing the electrolyte from an external source, the problems involved in these operations are rather intricate and, therefore, have contributed to discourage use of this type of lead dioxide-zinc reserve cells.

In view of the above, all the lead dioxide-zinc reserve type cells of the prior art have been considered to be highly disadvantageous in view of the fact that the operation of the above mentioned couple causes high gas evolution and poor low temperature characteristic, which render this type of cells rather useless in practice as an electrical generating unit.

BRIEF SUMMARY OF THE INVENTION

Having in mind the defects of the prior art cells, it is an object of the present invention to provide a lead dioxide-zinc rechargeable-type cell which will efficiently operate generating high electromotive forces for long periods of time.

Another object of the present invention is to provide a lead dioxide-zinc rechargeable-type cell the electrodes of which can remain permanently submerged in the electrolyte.

A more particular object of the present invention is to provide a lead dioxide-zinc rechargeable-type cell which will be fully rechargeable and thus operative for relatively long periods of time with the generation of a relatively high electromotive force.

The foregoing objects and other ancillary thereto are preferably accomplished as follows: according to a preferred embodiment of the invention, a lead dioxide-zinc rechargeable-type cell comprises at least one lead dioxide positive plate, at least one zinc metal negative plate and an electrolyte comprising zinc salts, aluminum sulfate, sodium sulfate, mercuric sulfate and sulfuric acid, in order to provide a solution of zinc ions which can act as an electrolytic bath during recharging of the cell, to deposit zinc metal on the zinc plate, whereby this plate may be fully regenerated for further current generation.

The novel features that are considered characteristic of the present invention are set forth with particularity in the appended claims. The invention itself, however, both as to its organization and its method of operation, together with additional objects and advantages thereof, will best be understood from the following detailed description of certain specific embodiments thereof, which must be construed as illustrative and not limitative of the true scope and spirit of the invention.

DETAILED DESCRIPTION

The lead dioxide-zinc rechargeable-type cell built in accordance with the present invention comprises at least a positive plate manufactured as a grid of lead-antimony filled with lead dioxide and at least a negative plate comprising a stainless steel web coated with a relatively thick layer of amalgamated zinc metal, parallely arranged in a spaced confronted relationship within a suitable container, and permanently submerged in an electrolyte containing zinc salts, a zinc surface-controlling agent, an electrolyte conductivity-correcting agent and an amalgamating agent to prevent formation of localized cells or electrolytic pairs, in an acid aqueous medium.

As it will be obvious to any one skilled in the art, a plurality of cells built in accordance with the present invention can be connected in series in order to form a fully rechargeable storage battery which will deliver electrical current at a voltage of over 2.5 per cell at open circuit.

The electrolyte incorporated in the cell built in accordance with the present invention is an acid solution of soluble sulfates, said electrolyte, during discharge of the cell, acting as a chemically aggressive medium on the zinc plate only when the external circuit of the cell is closed, while said electrolyte will act as an electroplating bath to redeposit zinc on the negative plate when recharging the cell.

More particularly, the formulation of the electrolyte which is incorporated in the rechargeable cell of the present invention, is a mixture of soluble sulfates in which the main component is zinc sulfate to enable the electrolyte to act as an electroplating bath during recharging of the cell, and wherein the agent for regulating the physical characteristics of the surface of the anodic zinc during the charging operation is aluminum sulfate, the agent for correcting the electrical conductivity of the electrolyte is sodium sulfate, the agent for suppressing the "treeing" effects on the anodic surfaces during the charging operation is sulfuric acid and the agent to minimize the formation of localized cells or electrolytic pairs on the zinc anode during discharge, is mercuric sulfate.

The electrolyte composition described above forms a chemically aggressive medium capable of continuously reacting on the zinc anode when the external circuit of the cell is closed, during discharge of the cell, whereas, when the cell is recharged, said electrolyte will constitute an electroplating bath from which the zinc, now in solution, will be redeposited on the negative zinc plate of the cell.

The electrolyte in accordance with the present invention, therefore, must be preferably a solution of zinc sulfate, sodium sulfate, aluminum sulfate, mercuric sulfate and sulfuric acid in distilled water.

Still more preferably, the electrolyte of the present invention may additionally contain a suitable gum such as dextrin to improve the physical characteristics of the zinc deposited, as well as a suitable anticorrosion agent such as dibutylamine to prevent corrosion when the battery is not in use and to minimize the necessity of amalgamating the zinc plates which renders said plates highly brittle.

Preferably the electrolyte of the present invention will have the following composition:

| | |
|---|---|
| Zinc sulfate | 1 – 5 gr |
| Sodium sulfate | 25 – 75 gr |
| Aluminum sulfate | 25 – 75 gr |
| Mercuric sulfate | 2 – 8 gr |
| Dextrin | 10 – 30 gr |
| Dibutylamine | 5 – 15 gr |
| Sulfuric acid | 250 – 500 gr |
| Distilled water, q.s. | 1000 ml. |

The electrolyte composition which has been found to give optimal results in connection with a rechargeable-type cell built in accordance with the present invention, however, is a solution having the following composition:

| | |
|---|---|
| Zinc sulfate | 2.5 gr |
| Sodium sulfate | 50 gr |
| Aluminum sulfate | 50 gr |
| Mercuric sulfate | 5 gr |
| Sulfuric acid | 300 gr |
| Dextrin | 20 gr |
| Dibutylamine | 10 gr |
| Distilled water, q.s. | 1000 ml |

It will thus be seen that there has been provided a new type of lead dioxide-zinc rechargeable-type cell which may be considered as fully rechargeable and which avoids the difficulties of the prior art cells of this type, in which the electrolyte had to be kept separate from the plates in view of its aggressiveness. As the electrolyte of the cell of the present invention is not aggressive at open circuits, the plates can remain permanently submerged in said electrolyte, whereby a new type of fully rechargeable cell has been provided, which can be handled as a unit without the need of providing means to remove the electrolyte from the plates when the battery is not in use. On the other hand, the formulation of the electrolyte of the present invention, with a moderate concentration of sulfuric acid prevents violent hydrogen evolution and renders this electrolyte suitable to act as an electroplating solution in order to redeposit zinc metal on the surface of the negative zinc plates of the cell, so as to regenerate the same by the passage of current therethrough. On the other hand, the electrolyte of the present invention is sufficiently aggressive at closed circuit to generate an electromotive force of over 2.5 volts and permits substantial drainage of current therefrom as against the cells of the prior art in which fast drainage caused complete spoilage of the plates in a relatively short time.

Although certain specific embodiments of the present invention have been shown and described above, it is to be understood that many modifications thereof are possible. The invention, therefore, is not to be restricted except insofar as is necessitated by the prior art and by the spirit of the appended claims.

What is claimed is:

1. A storage battery comprising a plurality of lead dioxide-zinc rechargeable-type cells connected in series, each cell comprising a positive lead dioxide plate, a negative amalgamated zinc metal plate spaced from said positive plate and parallely confronted thereto, with both plates being permanently submerged in an acid electrolyte comprising an aqueous solution of zinc sulfate, sodium sulfate, aluminum sulfate, mercuric sulfate, sulfuric acid, dextrin and dibutylamine.

2. A lead dioxide-zinc rechargeable type cell comprising
at least one positive lead dioxide plate,
at least one negative amalgamated zinc metal plate spaced from said positive plate and parallely confronted thereto,
both plates being permanently submerged in an acid aqueous electrolyte containing zinc sulfate, sodium sulfate, aluminum sulfate, mercuric sulfate, sulfuric acid, a small amount, sufficient to improve the physical characteristics of zinc deposited in said cell, of a gum and a small amount, sufficient to prevent corrosion when said cell is not in use and to minimize the amount of said mercuric sulfate as an amalgamating agent, of dibutylamine.

3. A lead dioxide-zinc rechargeable-type cell according to claim 2, wherein said gum is dextrin.

4. A lead dioxide-zinc rechargeable-type cell according to claim 2, wherein said aqueous electrolyte is an aqueous solution comprising from 1 to 5 g/l of zinc sulfate, 25 to 75 g/l of sodium sulfate, 25 to 75 g/l of aluminum sulfate, 2 to 8 g/l of mercuric sulfate, 250 to 500 g/l of sulfuric acid, 10 to 30 g/l of dextrin and 5 to 15 g/l of dibutylamine.

* * * * *